United States Patent
Fathallah et al.

(10) Patent No.: US 10,202,714 B2
(45) Date of Patent: *Feb. 12, 2019

(54) BRAIDED TEXTILE SLEEVE WITH SELF-SUSTAINING EXPANDED AND CONTRACTED STATES AND METHOD OF CONSTRUCTION THEREOF

(71) Applicant: Federal-Mogul Powertrain, LLC, Southfield, MI (US)

(72) Inventors: Amel Fathallah, Claye Souilly (FR); Ana Maria Panea, Compiègne (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 540 days.

This patent is subject to a terminal disclaimer.

(21) Appl. No.: 14/634,216

(22) Filed: Feb. 27, 2015

(65) Prior Publication Data

US 2016/0122915 A1 May 5, 2016

Related U.S. Application Data

(60) Provisional application No. 62/072,890, filed on Oct. 30, 2014.

(51) Int. Cl.
| | |
|---|---|
| *D04C 1/06* | (2006.01) |
| *D04C 1/02* | (2006.01) |
| *B29C 55/24* | (2006.01) |
| *B29B 11/14* | (2006.01) |
| *B29B 11/04* | (2006.01) |

(Continued)

(52) U.S. Cl.
CPC ............. *D04C 1/06* (2013.01); *B29B 11/04* (2013.01); *B29B 11/14* (2013.01); *B29C 35/02* (2013.01); *B29C 55/24* (2013.01); *D04C 1/02* (2013.01); *B29K 2101/10* (2013.01); *B29K 2105/258* (2013.01); *B29L 2023/001* (2013.01); *D10B 2505/12* (2013.01)

(58) Field of Classification Search
CPC .................................... D04C 1/02; D04C 1/06
See application file for complete search history.

(56) References Cited

U.S. PATENT DOCUMENTS

| | | | |
|---|---|---|---|
| 4,741,087 | A | 5/1988 | Plummer, Jr. |
| 4,777,859 | A | 10/1988 | Plummer, Jr. |

(Continued)

FOREIGN PATENT DOCUMENTS

| | | |
|---|---|---|
| CN | 101332133 A | 12/2008 |
| CN | 101405529 A | 4/2009 |

(Continued)

OTHER PUBLICATIONS

International Search Report, dated Jan. 27, 2016 (PCT/US2015/058298).

*Primary Examiner* — Shaun R Hurley
(74) *Attorney, Agent, or Firm* — Robert L. Stearns; Dickinson Wright, PLLC (57) ABSTRACT

A protective textile sleeve includes a braided, tubular wall extending lengthwise along a central longitudinal axis between opposite ends. The wall has a decreased length, increased diameter first state and an increased length, decreased diameter second state. Heat-set, braided yarns within the wall impart a bias on the wall, wherein the bias causes the first and second states to be bi-stable and self-sustaining.

20 Claims, 5 Drawing Sheets

(51) Int. Cl.
*B29C 35/02* (2006.01)
*B29K 101/10* (2006.01)
*B29K 105/00* (2006.01)
*B29L 23/00* (2006.01)

(56) References Cited

U.S. PATENT DOCUMENTS

| | | | |
|---|---|---|---|
| 4,870,887 A | 10/1989 | Tresslar et al. | |
| 5,186,992 A * | 2/1993 | Kite, III | D04C 1/02 428/198 |
| 5,197,370 A | 3/1993 | Gladfelter | |
| 5,505,117 A | 4/1996 | Dunlap et al. | |
| 5,866,216 A | 2/1999 | Flasher | |
| 6,325,815 B1 * | 12/2001 | Kusleika | A61B 17/221 606/200 |
| 8,910,554 B2 * | 12/2014 | Kinugasa | D04C 1/06 87/9 |
| 2003/0135265 A1 * | 7/2003 | Stinson | A61F 2/90 623/1.16 |
| 2003/0176884 A1 * | 9/2003 | Berrada | A61F 2/013 606/200 |
| 2007/0166495 A1 | 7/2007 | Sellis et al. | |
| 2007/0275199 A1 | 11/2007 | Chen | |
| 2009/0005847 A1 | 1/2009 | Adams | |
| 2009/0275974 A1 | 11/2009 | Marchand et al. | |
| 2010/0030321 A1 * | 2/2010 | Mach | A61F 2/07 623/1.18 |
| 2010/0084179 A1 * | 4/2010 | Harris | D02G 3/441 174/350 |
| 2011/0083879 A1 | 4/2011 | Avula et al. | |
| 2013/0060323 A1 | 3/2013 | McHugo | |
| 2013/0125739 A1 | 5/2013 | Kinugasa | |
| 2014/0220276 A1 * | 8/2014 | Gao | F16L 57/06 428/36.1 |
| 2016/0122916 A1 * | 5/2016 | Fathallah | D04C 1/06 87/9 |
| 2017/0121868 A1 * | 5/2017 | Zhang | D03D 3/02 |
| 2017/0121871 A1 * | 5/2017 | Krauser | D04C 1/02 |
| 2017/0137978 A1 * | 5/2017 | Gao | D04C 1/06 |
| 2017/0207005 A1 * | 7/2017 | Khosroshahi | H01B 7/18 |
| 2017/0226671 A1 * | 8/2017 | Zhang | D04C 1/06 |

FOREIGN PATENT DOCUMENTS

| | | |
|---|---|---|
| CN | 101461013 A | 6/2009 |
| CN | 102119040 A | 7/2011 |
| CN | 102667964 A | 9/2012 |
| CN | 103874794 A | 6/2014 |
| EP | 0935017 A2 | 8/1999 |

* cited by examiner

BRAIDED TEXTILE SLEEVE WITH SELF-SUSTAINING EXPANDED AND CONTRACTED STATES AND METHOD OF CONSTRUCTION THEREOF

CROSS-REFERENCE TO RELATED APPLICATION

This application claims the benefit of U.S. Provisional Application Ser. No. 62/072,890, filed Oct. 30, 2014, which is incorporated herein by reference in its entirety.

BACKGROUND OF THE INVENTION

1. Technical Field

This invention relates generally to textile sleeves, and more particularly to braided textile sleeves.

2. Related Art

It is known to protect elongate members in textile sleeves against a variety of environmental conditions and affects, or to just contain elongate members in textile sleeves for bundling and routing purposes, such as in knit, woven or braided sleeves. In the case of braided sleeves, the braided wall is commonly braided as a circumferentially continuous, seamless wall, sometimes referred to as a 'closed' wall. One known advantage of a closed, braided wall construction is that the wall can be circumferentially expanded to facilitate sliding the wall over an elongated member by manually pushing and physically holding the opposite ends of the wall in a compressed fashion. By pushing the opposite ends toward one another and manually holding the wall in an axially compressed state, the braided wall is caused to take on an increased diameter and a reduced length. When in the increased diameter state, the wall can be readily disposed over the elongate member. Then, after sleeve is installed over the elongate member, the installer can release the wall and the opposite ends automatically spring axially away from one another, thereby taking on a circumferentially decreased diameter and increased length.

Although the aforementioned ability to increase and decrease the diameter of a braided wall has an advantage over some other known types of sleeve construction, such as woven sleeves, it does come with potential drawbacks. Namely, the ability to manually increase the diameter of the braided sleeve requires applying a continual, externally applied compression force during installation, which can prove challenging, and thus, can complicate the ability of the installer to readily install the sleeve over the elongate member. Further complicating installation of a braided sleeve arises when the sleeve has a relatively long length. With the sleeve having a relatively long length, difficultly arises by having to axially compress the opposite ends toward one another without causing the sleeve to fold or buckle along the length of the sleeve. In addition, upon releasing the wall to have the sleeve resume its lengthened, decreased diameter state, the wall generally has a tendency to spring back, at least partially, toward its axially compressed configuration due to a pattern retention phenomenon caused by friction between the interlaced yarns. As such, the effective length of the sleeve can be unintentionally decreased.

SUMMARY OF THE INVENTION

In accordance with one aspect of the invention, a protective textile sleeve includes a braided, tubular wall extending lengthwise along a central longitudinal axis between opposite ends. The wall has a decreased length, increased diameter first state and an increased length, decreased diameter second state. The wall has heat-set, braided yarns imparting a bias on the wall, with the bias causing the wall to remain in the first and second states absent some externally applied force.

In accordance with another aspect of the invention, at least some of the heat-settable yarns can be braided in bundles, wherein the bundles include a plurality of yarns twisted with one another.

In accordance with another aspect of the invention, at least some of the bundles can be formed having loops interlinked with loops of another bundle.

In accordance with another aspect of the invention, at least some of the bundles can be formed entirely of the heat-settable yarns.

In accordance with another aspect of the invention, at least some of the bundles can include non-heat-settable yarn.

In accordance with another aspect of the invention, the wall snaps between the first and second states upon overcoming the bias imparted by the heat-set yarns.

In accordance with another aspect of the invention, a method of constructing a textile sleeve includes braiding a plurality of yarns with one another to form a seamless tubular wall extending lengthwise along a central longitudinal axis, with at least some of the yarns being provided as heat-settable yarns. The method further includes moving the wall to one of a decreased length, increased diameter first state or an increased length, decreased diameter second state, and then, heat-setting the heat-settable yarns while the wall is in the first state or second state to impart a bias on the wall via said heat-set yarns, with the bias causing the wall to remain in each of the first and second states absent an externally applied axial force causing the wall to be moved to the other of the first or second state.

In accordance with another aspect of the invention, the method can further include braiding the wall with a lace-braiding machine.

In accordance with another aspect of the invention, the method can further include forming bundles of the yarns by twisting at least some of the yarns together and braiding the bundles with one another.

In accordance with another aspect of the invention, the method can further include forming at least some of the bundles including at least one of the heat-settable yarns.

In accordance with another aspect of the invention, the method can further include forming at least some of the bundles including non-heat-settable yarn.

In accordance with another aspect of the invention, the method can further include further include forming at least some of the bundles including heat-settable yarns and non-heat-settable yarns.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1A:
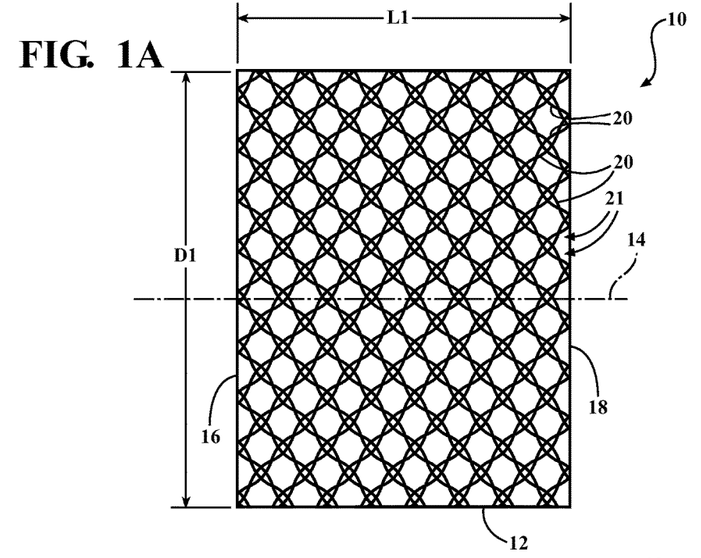
FIG. 1A is a schematic side view of a tubular braided sleeve constructed in accordance with one embodiment of the invention shown in an axially compressed, first state.
Figure 1B:
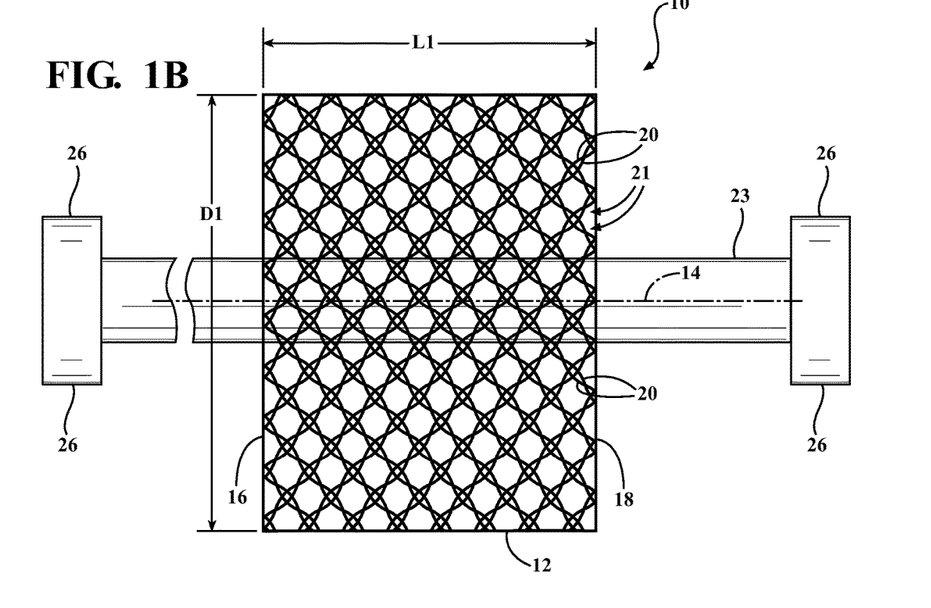
FIG. 1B is a schematic side view of the sleeve of FIG. 1A shown disposed about an elongate member to be protected while in its axially compressed, first state.
Figure 1C:
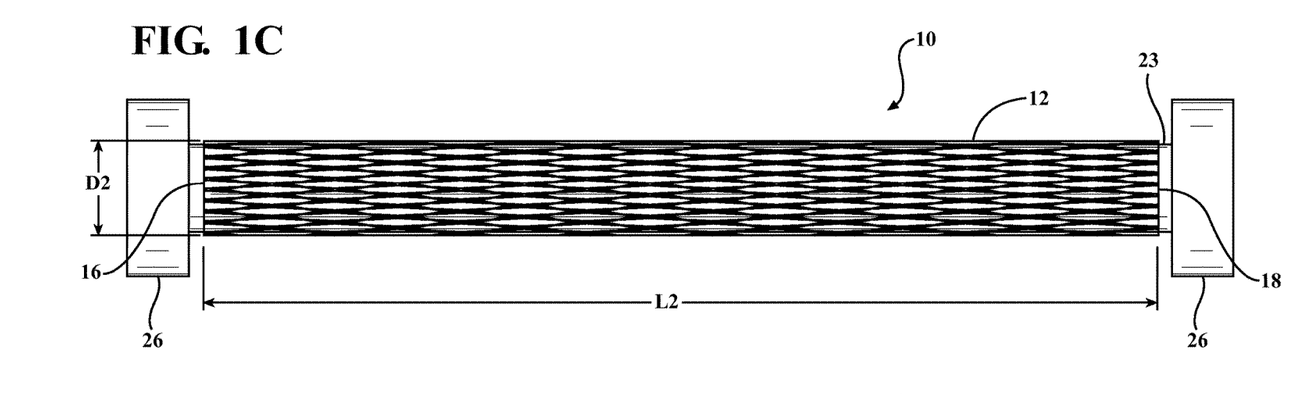
FIG. 1C is a side view of the sleeve of FIG. 1A shown in an axially extended, second state about the elongate member.

Referring in more detail to the drawings, FIGS. 1A-1C illustrate a braided protective textile sleeve, referred to hereafter as sleeve 10, constructed in accordance with one aspect of the invention. The sleeve 10 has a braided, circumferentially continuous, seamless tubular wall 12 extending lengthwise along a central longitudinal axis 14 between opposite ends 16, 18, wherein one or both of the ends 16, 18 can be formed as an open or closed end, shown as both being open ends 16, 18. The wall 12 is axially compressible to attain a pre-assembled first state, having a decreased length L1 and increased diameter D1 (FIGS. 1A and 1B) and is axially extendible to attain a fully assembled second state, having an increased length L2 and decreased diameter D2 (FIG. 1C). The wall 12 includes heat-settable, braided yarn 20, which upon being heat-set, imparts a bias on the wall 12. The bias imparted by the heat-set yarn 20 causes at least a portion of the wall 12 to remain in a selected one of the first and second states absent some externally applied force, wherein the externally applied force can be selectively applied to overcome the bias, thereby axially contracting and extending the wall 12 between the first and second states, as desired. Upon overcoming the bias via the externally applied force, the wall 12 then remains in the newly selected state, whether the first or second state, until the wall 12 is further acted on by a suitable external force to again move the wall 12 to a different stable configuration, whereupon the wall 12 remains in the new stable configuration until acted on by a suitable external force. Accordingly, the wall 12 has bi-stable, self-sustaining axially compressed first and axially extended second states, and multi-stable configurations of the wall 12 being made possible as a result thereof.

Figure 2:
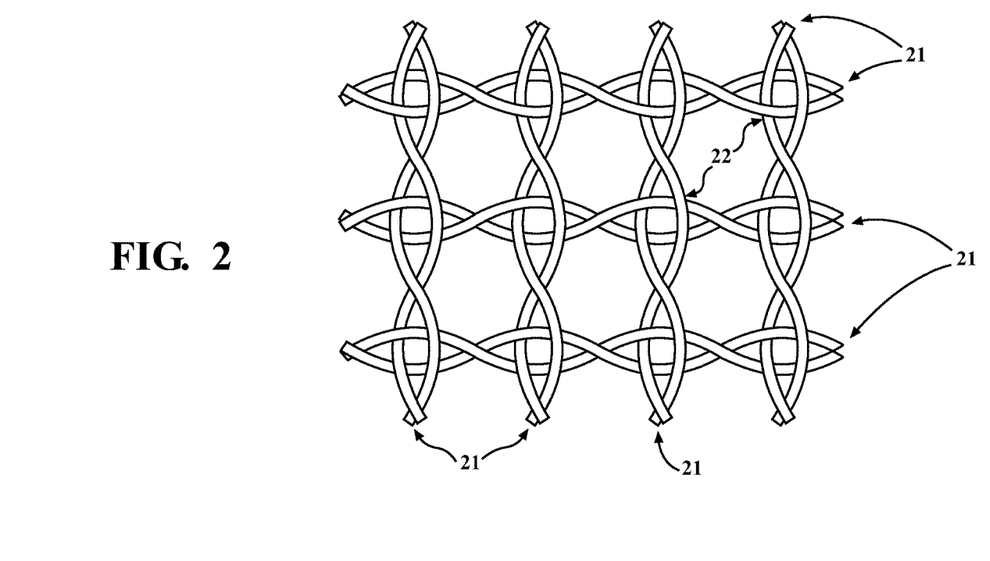
FIG. 2 is an enlarged fragmentary view of a wall of the sleeve of FIG. 1.

The wall 12 is preferably braided on a lace-braiding machine, though other braiding mechanisms are contemplated herein. In accordance with one aspect of the invention, the yarn, whether provided entirely of heat-settable yarn or only partially from heat-settable yarns, can be braided as bundles 21 of yarn, wherein the bundles 21 include a plurality of ends of yarn that can be twisted with one another, thereby allowing the separate bundles 21 of yarn to be braided as a single yarn. The embodiment illustrated in FIGS. 1-3 has individual bundles 21 (FIG. 2) braided with one another, with each bundle 21 including a pair of yarns twisted with one another. It should be recognized that more than 2 ends of yarn could be bundled with one another if desired for the intended application. The individual bundles 21 of twisted yarns are braided in S and Z directions (with S representing a first helical direction and Z representing an opposite helical direction). The bundles 21 are shown being interlinked with one another at cross-over locations by circumferentially closed openings or loops 22 (FIG. 2) formed within each of the respective twisted pairs of yarns, and thus, the individual pairs of bundled yarns are effectively interlinked and locked together such that they are inseparable from one another. The interlinking of the loops 22 is believed to enhance the effect of the bias to move the wall 12 between the first and second stable states and maintain the wall 12 or portion of the wall 12 in the selected state; however, it is contemplated herein that the yarns could be braided without being linked together.

Upon braiding the wall 12, the heat-settable yarn 20, which can be provided as a heat-settable monofilament or a heat-settable multifilament, such as from nylon, polyphenylene sulfide (PPS) or polyethyleneterephthalate (PET), by way of example and without limitation, is then heat-set. For maximum bias, the entire wall 12 is formed from heat-settable monofilaments, though, if desired to provide additional types of protection other than abrasion, such as thermal, acoustic or electromagnet interference (EMI), for example, at least some of the yarns can be provided as non-heat-settable yarn 24 (FIG. 4), such as a mineral fiber, e.g. basalt, silica, or ceramic or fiberglass, or as flexible conductive filaments, such as from wire, metal coated polymeric yarn filaments, or hybrid yarns including a conductive filament served or twisted with another yarn filament, such as a heat-settable or non-heat-settable monofilament and/or multifilament, for example. As such, the individual bundles 21 could have a desired number of heat-settable ends of yarn 20 and a desired number of non-heat-settable ends of yarn 24, as long as enough heat-settable yarns 20 are included to impart the bias necessary to maintain the wall 12 in its first and second positions. Prior to heat-setting the heat-settable yarn 20, the opposite ends 16, 18 of the wall 12 are axially compressed toward one another until the wall 12 is brought to its radially expanded, increased diameter D1, reduced length L1, first state, and then a suitable degree of heat is applied to the heat-settable yarn 20, thereby causing the heat-settable yarn 20 to take on a heat-set. Upon being heat-set, the wall 12 attains the bias imparted by the heat-set yarn 20 that tends to maintain the wall 12 in the selected in-use second state configuration having an axially extended length L2, reduced diameter D2 (FIG. 1C) or the in the pre-assembly first state configuration having a radially expanded diameter D1, axially reduced length L1 (FIGS. 1A and 1B). Regardless of which state the sleeve 10 is in, the sleeve 10 remains in that state until a sufficient externally applied, axial force is applied to overcome the bias imparted by the heat-set yarn 20. When a suitable force is applied along the axis 14 of the sleeve 10, the portion or section of the wall 12 acted on by the axial force snaps or springs from one state to the other, whether going from the first state to the second state, or vice versa. As such, it should be recognized, the entire length of the wall 12 can be formed into one of the first or second states, or any number of discrete lengthwise extending portions of the wall 12 can be manipulated to change between the first and second states, as desired. Accordingly, adjacent axially extending segments of the wall 12 can be biased to remain in different ones of the first and second states from one another, if desired.

During assembly of the sleeve 10 about an elongate member 23 to be bundled and protected, the wall 12 is axially compressed to the first state (FIG. 1A), wherein the wall 12 remains in the first state absent some externally applied forced sufficient to overcome the imparted bias of the heat-set yarn 20. If the wall 12 is relatively long, separate lengthwise extending regions can be axially compressed until the entire wall is axially compressed, thereby making it easy to transform the length of the wall 12 to the first, axially compressed state. As such, the sleeve 10 takes on an increased diameter D1, which allows the wall 12 to be more easily and readily disposed over the elongate member 23 to be protected (FIG. 1B), as well as over and about any connectors or fittings 26 attached thereto. Then, upon disposing the elongate member 23 through the radially expanded wall 12, an axial tensile force can be applied to the wall 12, such as by pulling the opposite ends 16, 18 axially away from one another, thereby causing the wall 12 to extend axially and snap from the radially expanded, reduced length first state to the radially contracted, increased length second state (FIG. 1C). It should be recognized that any portion or portions of the wall 12 can be lengthened, as desired, while leaving the remaining portion or portions in the first, radially expanded state, if desired. As such, the wall 12, which can be braided to extend over any desired axial length, can be extended axially over the desired length of the elongate member 23 to be protected. With the wall 12 being moved to the increased length L2, reduced diameter D2 second state, the wall 12 is able to contain the elongate member 23, such as a wire harness, for example, in the desired envelope to allow the elongate member 23 to be neatly bundled and routed, as desired. Further, in addition to the braided wall 12 acting to bundle the elongate member 23, particularly in the case of a wire harness having a plurality of individual, exposed wires, the wall 12 acts to provide protection to the elongate member 23 against abrasion, particularly if the heat-settable yarn 20 is provided as a monofilament. It should be recognized that the picks per inch can be provided, as desired, to provide the coverage needed for the intended application. As such, if less coverage is needed, a reduced picks per inch can be used, and if more coverage is needed, and increased picks per inch can be used. Further yet, the picks per inch can be varied over the length of the wall 12, as desired for the intended application. With less coverage, a benefit of seeing through the wall 12 is attained, thereby being able to see the contents within the sleeve, such as individual colors of separate wires, by way of example and without limitation. Otherwise, if with increased coverage, added protection against the ingress of contamination or enhanced acoustic and/or thermal protection can be provided.

Figure 3A:
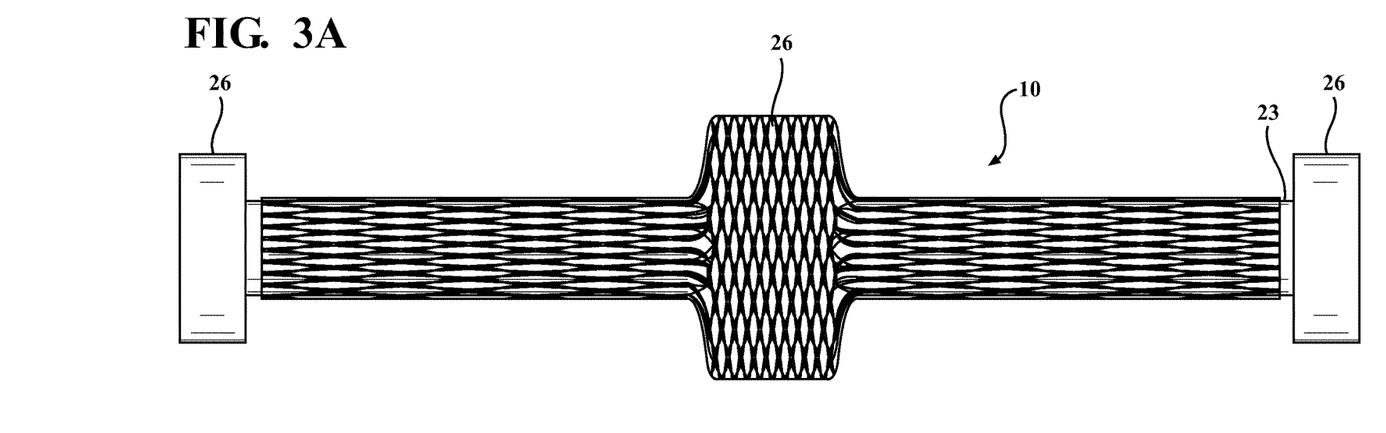
FIG. 3A is a view similar to FIG. 1C of the sleeve disposed about an elongate member having a centrally located connector.
Figure 3B:
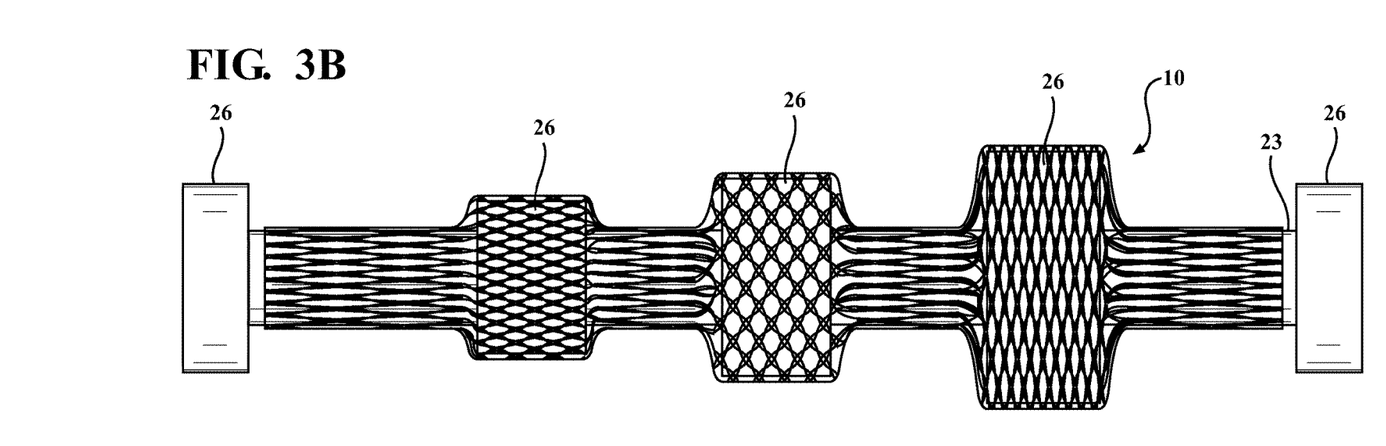
FIG. 3B is a view similar to FIG. 1C of the sleeve disposed about an elongate member having a plurality of intermediately located connectors.

In FIG. 3A, the sleeve 10 is shown extending about an elongate member 23 having a centrally located connector 26 between opposite end connectors 26. The ability of the sleeve 10 to remain expanded locally in the first state over a portion of the length of the sleeve 10 allows the wall 12 to accommodate the central connector 26, wherein the remaining portion of the sleeve 10 can be readily extended lengthwise to the second state upon assembly. It should be recognized that any number of expanded regions in the first state and contracted regions in the second state can be formed between the opposite ends 16, 18 of the sleeve 10, as desired, such as shown in FIG. 3B, wherein the elongate member 23 includes a plurality of intermediate connectors 26 to be received within the sleeve 10, thereby allowing the sleeve 10 to accommodate a multitude of different diameters of the elongate member 23 along the length of the sleeve 10.

Figure 4:
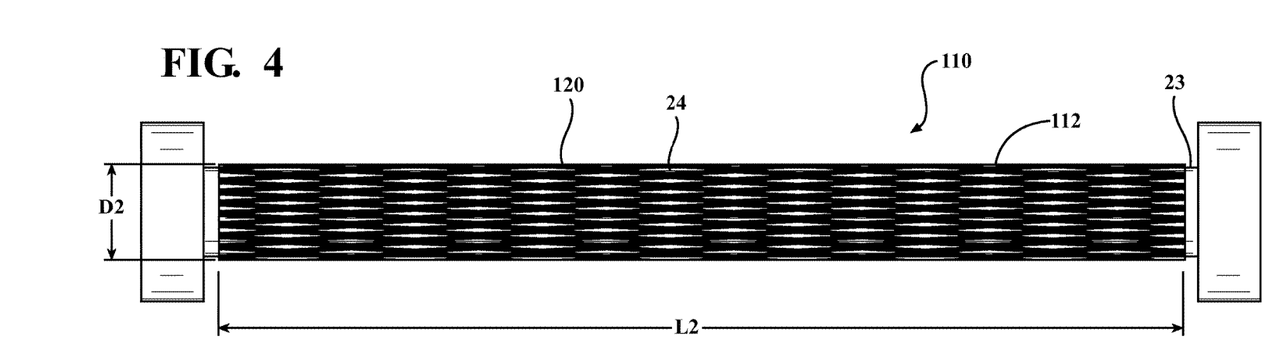
FIG. 4 is a view similar to FIG. 1C of a sleeve constructed in accordance with another aspect of the invention shown disposed about an elongate member.
Figure 5A:
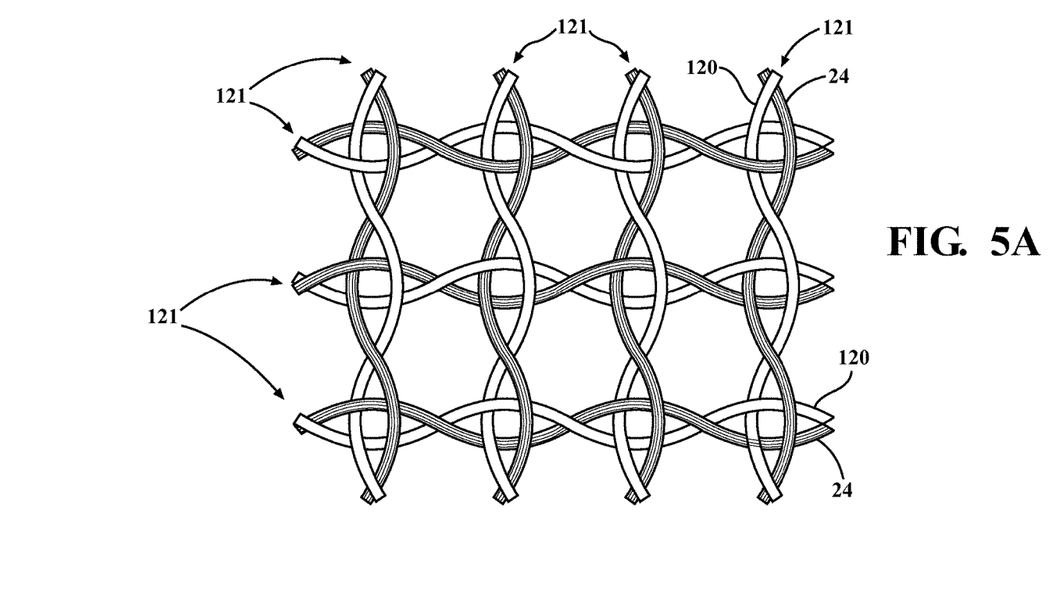
FIG. 5A is a view similar to FIG. 2 showing an enlarged fragmentary view of a wall of a sleeve constructed in accordance with another aspect of the invention.
Figure 5B:
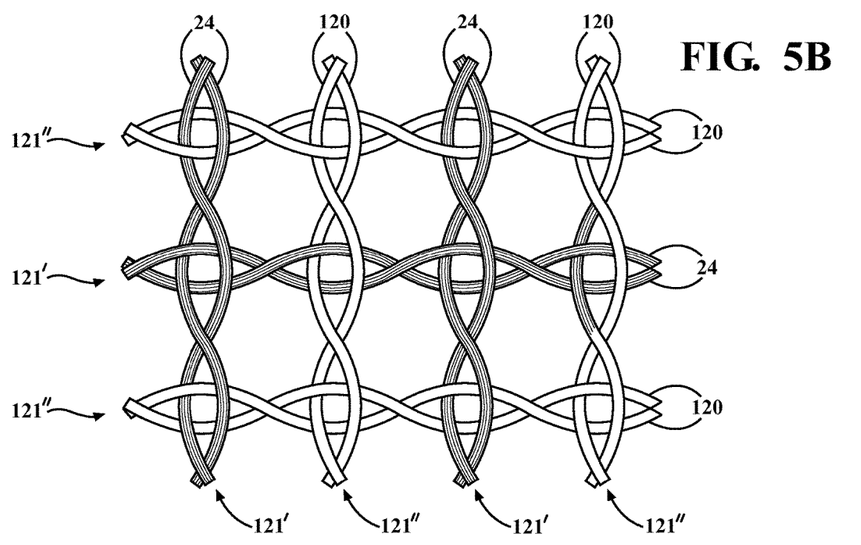
FIG. 5B is a view similar to FIG. 2 showing an enlarged fragmentary view of a wall of a sleeve constructed in accordance with yet another aspect of the invention.
Figure 5C:
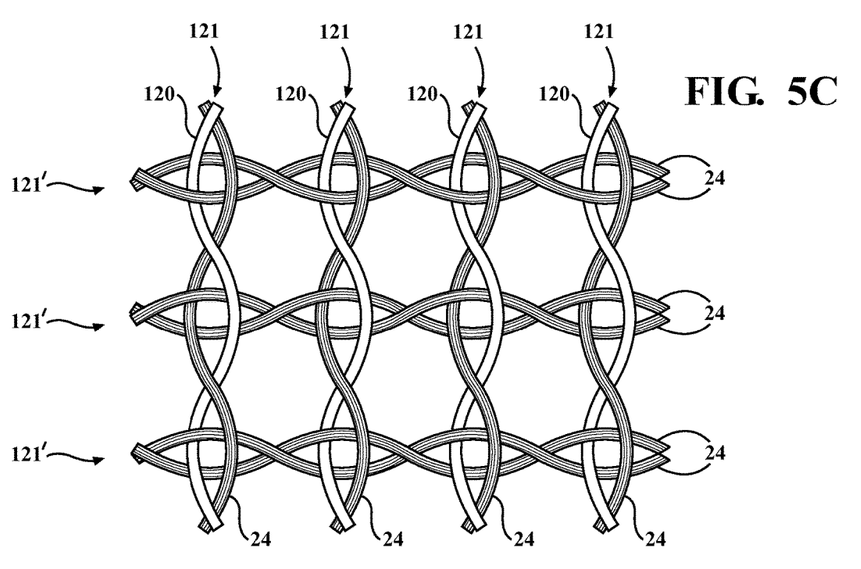
FIG. 5C is a view similar to FIG. 2 showing an enlarged fragmentary view of a wall of a sleeve constructed in accordance with yet another aspect of the invention.

In FIG. 4, a sleeve 110 constructed in accordance with another aspect of the invention is shown, wherein the same reference numerals as used above, offset by a factor of 100, are used to identify like features. The sleeve 110 has a braided wall 112 including heat-settable yarns 120, as discussed above, wherein upon being heat-set, impart a bias on the wall 112 that causes the wall 112 to remain in a selected first and second state. As such, absent some externally applied force causing the wall 112 to move, the wall 112 remains in a selected one of the first and second states. As discussed above, an externally applied force can be selectively applied to overcome the bias, thereby moving the wall 112 between the first and second states, as desired. The wall 112 of the sleeve 110 further includes non-heat-settable yarns 24 braided with the heat-settable yarns 120. The non-heat-settable yarns 24 can be provided as a multifilament yarn and/or a monofilament yarn, from materials discussed above to provide the desired type of protection. If provided as a multifilament yarn, enhanced coverage is provided, as generally shown in FIG. 4, to protect the elongate member 23 against contamination from external debris. Further, the multifilaments enhance the softness to the sleeve 110, thereby reducing the abrasive effects of the wall 112 against neighboring objects. The non-heat-settable yarns 24 can be bundled with the heat-settable yarns 120 to form discrete bundles 121 (FIG. 5A), shown as a single non-heat-settable yarn 24 being twisted with a single heat-settable yarn 120, by way of example and without limitation, wherein the discrete bundles 121 are braided with one another. As such, each of the bundles 121 provide dual benefits of being able to impart a bias upon being heat-set, while also providing enhanced coverage protection via inclusion of a non-heat-settable multifilament, for example. In addition, the non-heat-settable yarns 24 can be bundled with one another to form discrete bundles 121' entirely of non-heat-settable yarn, wherein the discrete bundles 121' can be braided with other bundles 121" containing heat-settable yarn 120, such as bundles of solely heat-settable yarn 120 (FIG. 5B), or, in accordance with another aspect of the invention, the bundles 121' containing solely non-heat-settable yarn 24 can be braided with bundles 121 containing both heat-settable yarn 120 and non-heat-settable yarn 24, in any desired braid pattern, such as shown in FIG. 5C, by way of example and without limitation.

Many modifications and variations of the present invention are possible in light of the above teachings. In addition, it is to be recognized that a braided tubular wall constructed in accordance with the various aspects of the invention can take on a multitude of uses, including that of a protective member, a bundling member, or even a novelty item, by way of example and without limitation. It is, therefore, to be understood that the invention may be practiced otherwise than as specifically described, and that the scope of the invention is defined by any ultimately allowed claims.

What is claimed is:
1. A protective textile sleeve, comprising:
   a braided, tubular wall extending lengthwise along a central longitudinal axis between opposite ends;
   said wall having a decreased length, extending from one of said opposite ends to the other of said opposite ends, increased diameter first state, and an increased length, extending from one of said opposite ends to the other of said opposite ends, decreased diameter second state, and further including heat-set, braided yarns imparting a bias on said wall, said bias causing said wall to remain in each of said first and second states absent some externally applied force.

2. The protective sleeve of claim 1 wherein at least some of said heat-set yarns are braided in bundles, said bundles including a plurality of yarns twisted with one another.

3. The protective sleeve of claim 2 wherein at least some said bundles have loops interlinked with loops of another bundle.

4. The protective sleeve of claim 2 wherein each of said bundles have loops interlinked with loops of another bundle.

5. The protective sleeve of claim 3 wherein at least some of said bundles are formed entirely of said heat-set yarns.

6. The protective sleeve of claim 5 wherein each of said bundles is formed entirely of said heat-set yarns.

7. The protective sleeve of claim 3 wherein at least some of said bundles include non-heat-settable yarn.

8. The protective sleeve of claim 1 wherein said heat-set yarn is a multifilament yarn.

9. The protective sleeve of claim 1 wherein said heat-set yarn is a monofilament yarn.

10. The protective sleeve of claim 1 wherein said wall snaps between said first and second states upon overcoming said bias.

11. The protective sleeve of claim 1 wherein said wall includes non-heat-settable yarns.

12. The protective sleeve of claim 11 wherein said non-heat-settable yarns are multifilament yarns.

13. The protective sleeve of claim 11 wherein said non-heat-settable yarns are monofilament yarns.

14. A method of constructing a textile sleeve, comprising:
braiding a plurality of yarns with one another to form a seamless tubular wall extending lengthwise along a central longitudinal axis between opposite ends with at least some of said yarns being provided as heat-settable yarns, said tubular wall being moveable between a decreased length, extending from one of said opposite ends to the other of said opposite ends, increased diameter first state and an increased length, extending from one of said opposite ends to the other of said opposite ends, decreased diameter second state; and
heat-setting said heat-settable yarns while said wall is in one of said first state and second state to impart a bias on said wall via said heat-set yarns, said bias causing said wall to remain in each of said first and second states absent an externally applied axial force causing said wall to be moved to the other of said first or second state.

15. The method of claim 14 further including braiding said wall with a lace-braiding machine.

16. The method of claim 14 further including forming bundles of said yarns by twisting at least some of said yarns together and braiding said bundles with one another.

17. The method of claim 16 further including forming at least some of said bundles including at least one of said heat-settable yarns.

18. The method of claim 17 further including forming each of said bundles entirely from said heat-settable yarns.

19. The method of claim 17 further including forming at least some of said bundles including non-heat-settable yarn.

20. The method of claim 19 further including forming at least some of said bundles including at least one of said heat-settable yarn and at least one of said non-heat-settable yarn.

* * * * *